(12) United States Patent
Echartea et al.

(10) Patent No.: US 6,748,506 B2
(45) Date of Patent: Jun. 8, 2004

(54) BUS FRAME PROTOCOL

(75) Inventors: Jesus Palomino Echartea, Jal (MX); Guillermo Lopez Lopez, Jal (MX); Shiro Suzuki, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 09/978,620

(22) Filed: Oct. 15, 2001

(65) Prior Publication Data

US 2003/0074503 A1 Apr. 17, 2003

(51) Int. Cl.$^7$ ................................................ G06F 12/00
(52) U.S. Cl. .................... 711/167; 711/170; 710/23; 710/52; 710/310
(58) Field of Search ................ 709/213, 215; 710/23, 30, 33, 52, 117, 124, 310; 711/170, 220, 221, 167

(56) References Cited

U.S. PATENT DOCUMENTS

| | | | |
|---|---|---|---|
| 4,546,429 A | * 10/1985 | Chan et al. .................... 710/45 |
| 5,086,425 A | 2/1992 | Le Goffic et al. | |
| 5,351,236 A | * 9/1994 | Pawelski .................... 370/358 |
| 5,926,629 A | * 7/1999 | Gulick ........................ 710/117 |
| 5,970,240 A | * 10/1999 | Chen et al. .................... 703/25 |
| 6,298,045 B1 | 10/2001 | Pang et al. | |
| 6,467,003 B1 | * 10/2002 | Doerenberg et al. ........ 710/117 |
| 2003/0012214 A1 | * 1/2003 | Munter ........................ 370/429 |

FOREIGN PATENT DOCUMENTS

EP 0594355 4/1994

OTHER PUBLICATIONS

"Design of an ATM Switch for Handoff Support," Kim et al, Wireless Networks, vol. 6, Dec. 2000, pp. 411–419.*
Cavalieri et al., "Fault tolerance in Interbus–S standard" Computer Standards and Interfaces, Elsevier Sequoia 23:3:223–235, 2001.

* cited by examiner

Primary Examiner—Donald Sparks
Assistant Examiner—Christian P. Chace
(74) Attorney, Agent, or Firm—Fish & Richardson P.C.

(57) ABSTRACT

A memory stores data for transfer over a bus by a computer program that operates according to a bus frame protocol. The memory includes a data structure stored in the memory. The data structure includes a matrix having blocks arranged in N rows and M columns, where N and M are integers that are greater than one. A block of the matrix includes data used with the bus frame protocol and corresponds to a destination port and a time slot for the data.

30 Claims, 3 Drawing Sheets

TABLE 1. EXAMPLE OF SOME FRAMES INSIDE STRUCTURE

| 0,0 | 1,1 | 2,0 | | 26,2 | 27,11 |
|---|---|---|---|---|---|
| 0,1 | 1,2 | 2,1 | | 26,3 | 27,12 |
| 0,2 | 1,3 | 2,2 | | 26,4 | 27,13 |
| | | | | | |
| | | | | | |
| 0,29 | 1,30 | 2,29 | | 26,31 | 27,8 |
| 0,30 | 1,33 | 2,30 | | 26,0 | 27,9 |
| 0,31 | 1,0 | 2,31 | | 26,1 | 27,10 |

TABLE 1. EXAMPLE OF SOME FRAMES INSIDE STRUCTURE

| 0,0 | 1,1 | 2,0 | ... | 26,2 | 27,11 |
|-----|-----|-----|-----|------|-------|
| 0,1 | 1,2 | 2,1 | ... | 26,3 | 27,12 |
| 0,2 | 1,3 | 2,2 | ... | 26,4 | 27,13 |
| ... | ... | ... | ... | ...  | ...   |
| 0,29 | 1,30 | 2,29 | ... | 26,31 | 27,8 |
| 0,30 | 1,33 | 2,30 | ... | 26,0  | 27,9 |
| 0,31 | 1,0  | 2,31 | ... | 26,1  | 27,10 |

FIG. 3

BUS FRAME PROTOCOL

TECHNICAL FIELD

This invention relates to a bus frame protocol for transmitting data to one or more devices over a time-division multiplexed (TDM) bus.

BACKGROUND

A TDM bus receives multiplexed data from several devices and passes the data to different ports on a receiving device. On the receiving device, multiple pins are required to accommodate data for each of the ports. For example, in conventional TDM buses, there are four sets of pins for transmitting data to a device and four sets of pins for receiving data from a device. Thus, as the number of ports increases on a device, the number of pins on a conventional TDM bus can increase dramatically.

DESCRIPTION OF THE DRAWINGS

FIG. 3 is a table showing a specific example of the generic frame structure shown in FIG. 2.

DESCRIPTION

Figure 1:
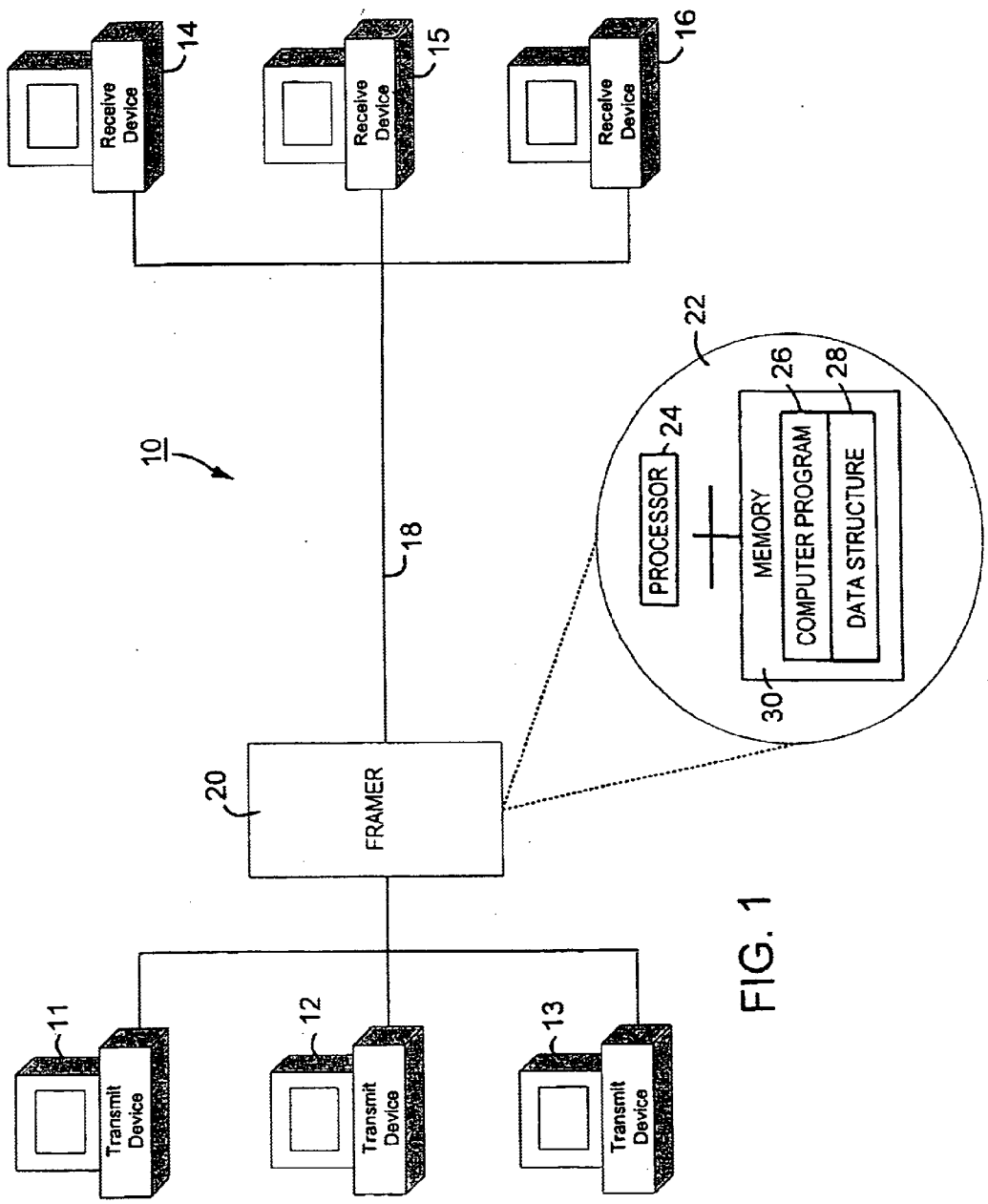
FIG. 1 is a view of a computer system having a TDM bus.

Referring to FIG. 1, a computer system 10 is shown. Computer system 10 includes various devices 11 to 16. Devices 11 to 16 may be any type of digital device that is capable of transmitting and receiving data. For example, devices 11 to 16 may include microprocessors, digital signal processors (DSPs), network interface cards, and the like. Devices 11 to 16 may also include networked computers or networked computer peripheral devices, such as printers and photocopiers.

For the sake of this description, devices 11 to 13 are referred to as the "transmitting devices", since they will be described as transmitting data. Devices 14 to 16 are referred to as the "receiving devices", since they will be described as receiving data. It is noted, however, that each of the transmitting devices is typically also capable of receiving data and each of the receiving devices is typically also capable of transmitting data. In fact, the transmitting and receiving devices may be the same types of device.

Devices 11 to 13 and 14 to 16 exchange data over a TDM bus 18. In this embodiment, TDM bus 18 is between twelve and seventeen bits wide and runs off of a 33 Megahertz (MHz), or lower-speed, clock. Other embodiments, however, may use TDM buses having different widths and different clock speeds.

Framer 20 is a device that receives, from transmitting devices 11 to 13, data that is destined for ports on receiving devices 14 to 16. Framer 20 generates a data structure comprised of multiplexed (i.e., interleaved) frames of data from transmitting devices 11 to 13. Framer 20 transmits elements of the data structure, block-by-block (described below), onto TDM bus 18. Thus, data from different transmitting devices is transmitted sequentially onto TDM bus 18 to the receiving devices. Demultiplexers (not shown) at the bus pins of the receiving devices demultiplex the data stream containing data from different transmitting devices and, based on information contained in the blocks, sends the data to the appropriate ports on the receiving device.

As shown in view 22, framer 20 contains a processor 24, such as a microcontroller or microprocessor, for executing a computer program 26 to generate a data structure from data that framer 20 receives from the transmitting devices. The data structure 28 is constructed and stored in memory 30, which may be any type of machine-readable medium. From memory 30, processor 24 in framer 20 transmits the blocks of data onto TDM bus 18 at the appropriate data rate.

Figure 2:
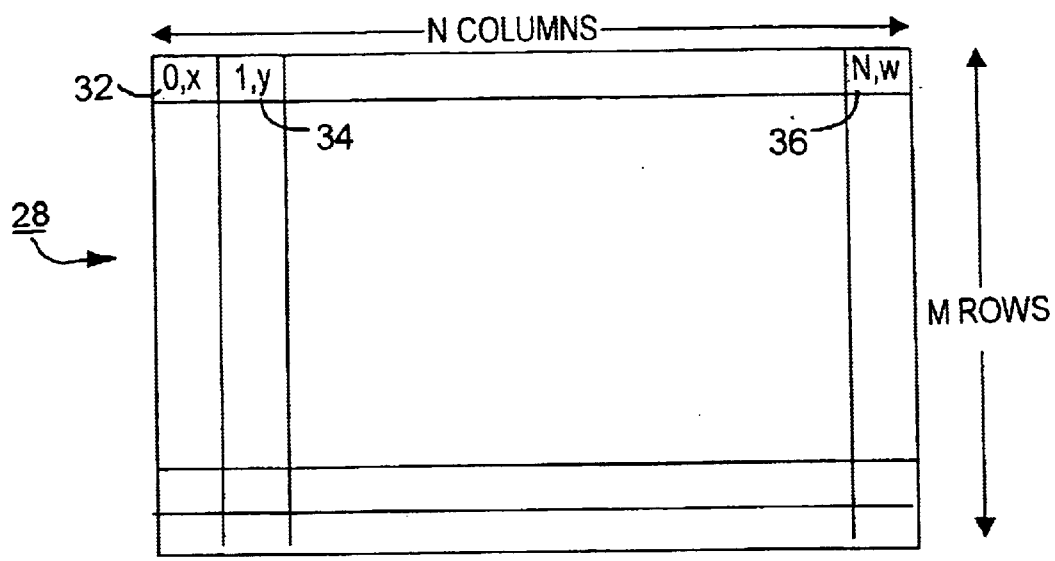
FIG. 2 is a table showing a generic structure for data frames transmitted over the TDM bus of FIG. 1.

Referring to FIG. 2, data structure 28 is a matrix having blocks of data arranged in N columns and M rows, where N and M are integers that are greater than one. In this embodiment, there are 32 rows. Each block of data structure 28 includes data that is used with the bus frame protocol described herein and that corresponds to a destination port on a receiving device and a time slot for the data. As noted, the destination port identifies a port on a receiving device to which the data is destined. The time slot provides an ordered relationship for the data transmitted to a port.

Referring to FIG. 2, each block 32 of data structure 28 contains two numbers, e.g., "0,x", "1,y"... "N,w", where N is an integer greater than one. The first of these numbers (the row number) "0", "1", and "N" provides the port number of the data for that block. Thus, block 32 is destined for port "0", block 34 is destined for port "1", block 36 is destined for port "N", etc. In this embodiment, the ports of the receiving devices are assigned different numbers, so there is no need to identify the device in each data block. The second number in each data block (the column number), e.g., "x", "y", "w", where "x", "y", "w" are integers, provides the time slot of blocks of data for each frame, i.e., each column, of data.

By way of example, FIG. 3 shows an example of a data structure 38. As shown, each column 40, 42, etc., corresponds to a frame of data destined for a port on a receiving device. Thus, column 40 is destined for port "0", column 42 is destined for port "1", column 44 is destined for port "26", and so on. The time slots, e.g., 46 in column 40 and 48 in column 42, dictate an ordered relationship of the blocks of data in each column, i.e., the data for each port.

In this embodiment, framer 20 transmits data onto TDM bus 18 row-by-row. That is, referring to FIG. 3, framer 20 transmits the data starting with block 50, then block 52, etc., then block 54, then block 56 until row 58 has been transmitted. Framer 20 then transmits row 60, starting with block 62, then block 64, etc., then block 66, then block 68 until row 60 has been transmitted. Framer 20 then transmits row 70 in the same manner, and so on, until the entire data structure 38 has been transmitted onto TDM bus 18. Once the entire data structure 38 has been transmitted, framer 20 proceeds to transmit another such data structure (not shown).

In this embodiment, each block of data is one byte; however, this is not a requirement. Each block of data may constitute information, such as audio, video, text, etc. being transmitted between devices. Alternatively, blocks of the data may constitute different signals used to implement the bus frame protocol described herein. Examples of signals that may be defined by the data are described below.

The data may define a structure start indicator signal ("ST"). The structure start indicator signals a start of a new matrix, i.e., a new data structure 28 (FIG. 2). The structure start indicator is placed in the "(0,0)" block of a data structure. The receiver may use this information to determine timing information relating to data transmission over TDM bus 18, as described in more detail below.

The data may define a port frame start indicator signal ("FS"). The port frame start indicator signals a start of a frame (i.e., a new column of data) for a port. The structure start indicator is placed in the "(N,0)" row of the data structure, where N is as defined in FIG. 2. Thus, each port can have its frame start on any row of the data structure. In this embodiment, the distance between frames is at least 32 rows; otherwise a change in frame alignment is assumed.

The data may define a multiframe start indicator signal ("MFS"). The multiframe start indicator identifies multiple frames for a single port. That is, if more than one frame of data structure 28 is destined for the same port, the multiframe start indicator identifies those frames.

The data in a block may be a clock signal, a filler byte, information and/or signaling information being transmitted between two devices. In this embodiment, the bus clock signal ("CLK") runs at a minimum speed of N*2.048/8 MHz when transporting E1 and/or T1 data streams. A 33 MHz clock can handle up to 128 ports. A filler byte, also called a "stuff byte", does not contain substantive data and is added to prevent device contention and/or to implement proper timing.

In this embodiment, a single data structure 28 (FIG. 2) may contain both transmit and receive data, e.g., data that is being transmitted from the transmitting devices and that is being received by the transmitting devices. In this case, the frames (columns) of data structure 28 contain interleaved transmit frames and receive frames. In this context, the transmit frames are for driving data onto TDM bus 18 and the receive frames are for reading data from TDM bus 18.

One or more of the frames (columns) of data structure 28 may be a filler frame that is positioned between two sets of frames associated with two different data driving devices. The filler frame may be used in compensating for different transport rates of at least two of the transmitting devices. By way of example, one of the transmitting devices 11 may drive columns zero to eight of data structure 28. Another of the transmitting devices 12 may drive columns nine to sixteen of data structure 28. Column eight of data structure 28 may contain a filler frame, so as to separate columns zero to eight and nine to sixteen, and thus prevent the different devices from driving data to the same column (which may occur if the different devices have different data transport rates).

Since a device can handle data in both the transmit (Tx) and receive (Rx) directions, two buses may be used—one bus for each direction. In this embodiment, each bus may transport a maximum of seventeen signals. In addition, the bus may use the same data pins to handle both Tx and Rx data. The bandwidth for the bus in this configuration is doubled and the number of pins in the bus is reduced. In this case, some switching/demultiplexing at the port level can be performed to provide the appropriate data to the appropriate ports.

Thus, TDM bus 18 can operate in two modes: a MUX (multiplexed) mode and a NON-MUX (non-multiplexed mode). In the NON-MUX mode, separate buses are used for the signals. In the MUX mode, Rx and Tx information is driving (i.e., sending data to or receiving data from) the same pins. In this case, a transmitting and/or receiving device is programmed so that some columns in data structure 28 will drive the Rx data and some columns in data structure 28 will drive the Tx data.

Signaling information between two devices can be transported in dedicated pins or dedicated blocks. In this case, the number of rows of data structure 28 should be 33 (not 32) for E1 modes. The slot following the last data block may be used to transport signaling information for two channels. The channel number may be calculated according to the position of the MFS signal. In this embodiment, signaling information may be transported for channels 0, 1, 2 up to 31.

Figure 4:
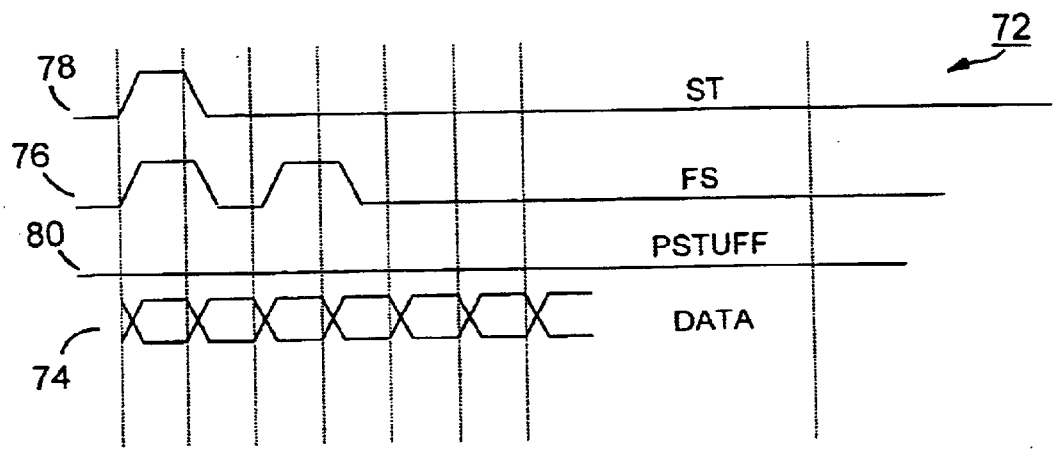
FIG. 4 is a graph showing data transmission over the TDM bus of FIG. 1.

Referring to FIG. 4, a timing diagram 72 of signals on TDM bus 18 (FIG. 1) is shown. As shown, data 74 for a first port is transmitted when the FS 76 and ST 78 signals are high. This will mark the "TS0" for E1 streams or "F byte" for T1 streams. Subsequent bytes in the first column (column 0) of data structure 28 will be the sequence of time slots (0 to 31) for the port that corresponds to column 0. At any point, if the stuff byte 80 ("Pstuff") becomes a one, the current corresponding data byte is discarded, as are subsequent bytes, until the stuff byte returns to zero.

A receiving device, such as device 14, receives data from bus 18. A demultiplexer (not shown) in the receiving device demultiplexes the data from TDM bus 18, reads the port destination of the resulting data packets, and sends the data packets to the appropriate ports on receiving device 14. One or more buffers (not shown), in a receiving device may be used to determine timing information relating to frames of data being received from TDM bus 18. For example, a first-in-first-out (FIFO) buffer may be used to obtain timing information for frames of data transmitted over TDM bus 18. In more detail, the FIFO buffer fills with a frame of data for a particular port. The start time of that frame may be compared with the start time of a subsequent frame in order to determine the data transmission rate of the frames.

In addition, the FIFO may be used to reduce jitter resulting from transmission of the data over TDM bus 18. In this context, "jitter" results from non-constant transmission of data over TDM bus 18. In this regard, each frame is supposed to be periodic with a given clock frequency. The use of the "stuff byte"; however, changes the period of the frame to accommodate the difference between a predetermined period associated with a previously-transmitted "master" frame and a currently-transported frame. Data may be read out of the FIFO at a rate that corrects for the non-constant transmission (jitter) over TDM bus 18.

A process implemented in framer 20 to generate data structure 28 may be implemented as machine-executable instructions that are executed by a processor out of a memory, such as a random access memory (RAM). The process, however, is not limited to this; it may find applicability in any computing or processing environment.

The process may be implemented in hardware, software, or a combination of the two. The process may be implemented in computer programs executing on programmable machines that each includes a processor, a storage medium readable by the processor (including volatile and non-volatile memory and/or storage elements), at least one input device, and one or more output devices. Program code may be applied to data entered using an input device, such as a mouse or a keyboard, to perform the process and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform the process. The process may be implemented as one or more articles of manufacture, such as a machine-readable storage medium, configured with a computer program, where, upon execution, instructions in the computer program cause the machine to operate in accordance with the process.

The invention is not limited to the embodiments described above. For example, the invention is not limited to the specific hardware and software of FIG. 1. The invention is not limited to the particular framing and data structure described herein. Any appropriate structures may be used.

Other embodiments not described herein are also within the scope of the following claims.

What is claimed is:

1. A memory for storing data for transfer over a bus to one or more receiving devices by a computer program that operates according to a bus frame protocol, where each receiving device has one or more destination ports, the memory comprising:

a data structure stored in the memory, the data structure comprising a matrix having blocks arranged in M rows and N columns, where N and M are integers that are greater than one, a block of the matrix including data used with the bus frame protocol and designating a destination port of a receiving device and a time slot for the data.

2. The memory of claim 1, wherein the N columns correspond to destination ports and the N columns correspond to frames of data for the destination ports.

3. The memory of claim 1, wherein the block corresponds to a byte of data.

4. The memory of claim 1, wherein the data comprises a structure start indicator, the structure start indicator signaling a start of the matrix.

5. The memory of claim 1, wherein the N columns correspond to N frames for N ports, respectively, and the data comprises a port frame start indicator, the port frame start indicator signaling a start of a frame for a port.

6. The memory of claim 1, wherein the N columns correspond to N frames for N ports, respectively, and the data comprises a multiframe start indicator, the multiframe start indicator identifying frames for a port.

7. The memory of claim 1, wherein the data comprises a clock signal.

8. The memory of claim 1, wherein the data comprises a filler byte.

9. The memory of claim 1, wherein the data comprises signaling information being transmitted between two devices.

10. The memory of claim 1, wherein the N columns correspond to N frames, the N frames comprising interleaved transmit frames and receive frames, the transmit frames for driving data onto the bus and the receive frames for reading data from the bus.

11. The memory of claim 1, wherein the N columns correspond to N frames for N ports, respectively, one of the N frames comprising a filler frame positioned between two sets of frames associated with two different data driving devices.

12. The memory of claim 1, wherein the N columns correspond to N frames for N devices, at least one of the N frames comprising a filler frame that is used in compensating for different transport rates of at least two of the N devices.

13. An apparatus comprising:

a bus;

a memory which stores a data structure comprising a matrix having blocks arranged in M rows and N columns, where N and M are integers that are greater than one, a block of the matrix including data used with a bus frame protocol for transmission over the bus to one or more receiving devices, each receiving device having one or more destination ports, wherein each block designates a destination port of a receiving device and a time slot for the data; and a driver which transmits data from the data structure onto the bus row-by row.

14. The apparatus of claim 13, wherein the driver is programmed to read data from specified columns of the data structure.

15. The apparatus of claim 13, wherein the N columns correspond to destination ports and the N columns correspond to frames of data for the destination ports.

16. The apparatus of claim 13, wherein the block corresponds to a byte of data.

17. The apparatus of claim 13, wherein the data comprises a structure start indicator, the structure start indicator signaling a start of the matrix.

18. The apparatus of claim 13, wherein the N columns correspond to N frames for N ports, respectively, and the data comprises a port frame start indicator, the port frame start indicator signaling a start of a frame for a port.

19. The apparatus of claim 13, wherein the N columns correspond to N frames for N ports, respectively, and the data comprises a multiframe start indicator, the multiframe start indicator identifying frames for a port.

20. The apparatus of claim 13, wherein the data comprises a clock signal.

21. The apparatus of claim 13, wherein the data comprises a filler byte.

22. The apparatus of claim 13, wherein the data comprises signaling information being transmitted between two devices.

23. The apparatus of claim 13, wherein the N columns correspond to N frames, the N frames comprising interleaved transmit frames and receive frames, the transmit frames for driving data onto the bus and the receive frames for reading data from the bus.

24. The apparatus of claim 13, wherein the N columns correspond to N frames for N ports, respectively, one of the N frames comprising a filler frame positioned between two sets of frames associated with two different data driving devices.

25. The apparatus of claim 13, wherein the N columns correspond to N frames for N devices, at least one of the N frames comprising a filler frame that is used in compensating for different transport rates of at least two of the N devices.

26. An article comprising machine-executable instructions for storing data for transfer over a bus to one or more receiving devices by a computer program that operates according to a bus frame protocol, where each receiving device has one or more destination ports, the instructions causing a machine to:

store a data structure in memory, the data structure comprising a matrix having blocks arranged in M rows and N columns, where N and M are integers that are greater than one, a block of the matrix including data used with the bus frame protocol and designating a destination port of a receiving device and a time slot for the data.

27. The article of claim 26, wherein the N columns correspond to destination ports and the N columns correspond to frames of data for the destination ports.

28. The article of claim 26, wherein the N columns correspond to N frames, the N frames comprising interleaved transmit frames and receive frames, the transmit frames for driving data onto the bus and the receive frames for reading data from the bus.

29. The article of claim 26, wherein the N columns correspond to N frames for N ports, respectively, and the data comprises a port frame start indicator, the port frame start indicator signaling a start of a frame for a port.

30. The article of claim 26, wherein the N columns correspond to N frames for N ports, respectively, and the data comprises a multiframe start indicator, the multiframe start indicator identifying frames for a port.

* * * * *